United States Patent [19]

Symons

[11] Patent Number: 5,549,863
[45] Date of Patent: Aug. 27, 1996

[54] COMPOSITE BOARD

[75] Inventor: Michael W. Symons, Pretoria, South Africa

[73] Assignee: Plascon Technologies (Proprietary) Limited, Bedfordview, South Africa

[21] Appl. No.: 289,373

[22] Filed: Aug. 12, 1994

[30] Foreign Application Priority Data

Aug. 13, 1993 [ZA] South Africa ............... 93/5928

[51] Int. Cl.$^6$ ................ B27N 3/10; B32B 31/00; B32B 9/04
[52] U.S. Cl. ........ 264/257; 264/258; 264/331.11; 156/228; 156/243; 156/276; 156/278; 156/280; 156/297; 428/74; 428/224; 428/304.4; 428/320.2; 428/411.1; 428/412; 428/413; 428/473.5; 428/474.4; 428/480
[58] Field of Search ................ 264/257, 258, 264/331.11; 156/228, 243, 276, 278, 280, 297; 428/74, 224, 304.4, 320.2, 411.1, 412, 413, 473.5, 474.4, 480

[56] References Cited

U.S. PATENT DOCUMENTS

| 4,083,743 | 4/1978 | Degens | 156/278 |
|---|---|---|---|
| 4,214,932 | 7/1980 | Van Auken | 156/187 |
| 4,339,490 | 7/1982 | Yoshioka et al | 428/213 |
| 4,379,013 | 4/1983 | Tambussi | 156/189 |
| 4,514,532 | 4/1985 | Hsu et al. | 524/14 |
| 4,521,477 | 6/1985 | Kiss | 428/282 |
| 4,562,103 | 12/1985 | Hering | 428/76 |
| 4,619,344 | 10/1986 | Uesugi et al. | 181/229 |
| 4,784,899 | 11/1988 | Ono et al. | 428/236 |
| 5,112,663 | 5/1992 | Morenz et al. | 428/71 |

FOREIGN PATENT DOCUMENTS

| 0075033 | 3/1983 | European Pat. Off. . |
|---|---|---|
| 0390536 | 10/1990 | European Pat. Off. . |
| 0501826 | 9/1992 | European Pat. Off. . |
| 7500872 | 7/1976 | Netherlands . |

Primary Examiner—Melvyn I. Marquis
Assistant Examiner—Randy Gulakowski
Attorney, Agent, or Firm—Cushman Darby & Cushman

[57] ABSTRACT

A method of making a composite board comprising (a) applying a layer of a first composition comprising a thermosetting resin and a catalyst therefor to the surface of a mould; (b) allowing the thermosetting resin to polymerize; (c) applying a layer of a connecting composition comprising an adhesive or a second composition of thermosetting resin and catalyst to the layer (a); and (d) placing a structure comprising one or more laminae on the connecting composition, each lamina comprising first and second sheets of material fibre material and a corrugated sheet or a cellular core of natural fibre material sandwiched between the first and second sheets, the lamina being impregnated with thermosetting resin, extender and catalyst; the thermosetting resin being polymerized on the layer of step (c); (e) allowing the connecting composition to set and removing the composite board from the mould. An alternative to (d) and (e) involves (f) applying to the layer of (c), a layer of fibrous reinforcing material welted with thermosetting resin and catalyst, allowing the resin to polymerize and allowing the connecting composition to set so as to form an intermediate composite which is removed from the mould. The structure of (d) is then applied to the free side of the intermediate composite using a layer of the connecting composition of step (c) and the connecting composition is allowed to set to join the structure to the free side of the intermediate composition to form the composite board.

15 Claims, 1 Drawing Sheet

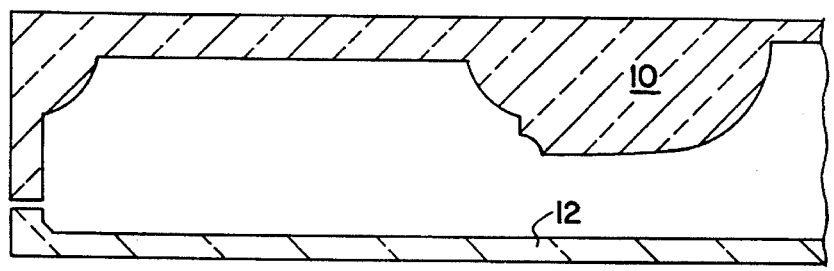
FIG. IA
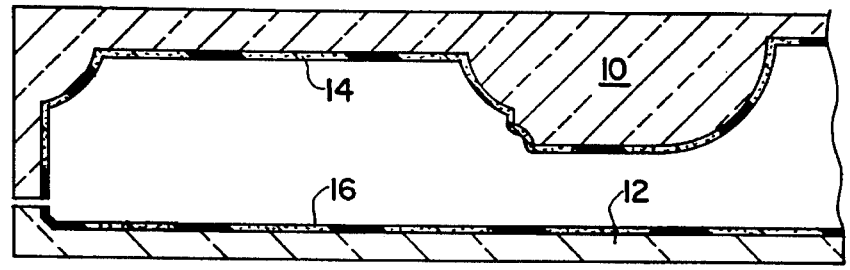
FIG. IB
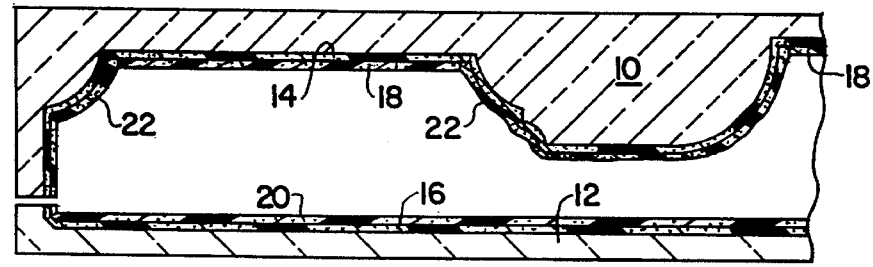
FIG. IC
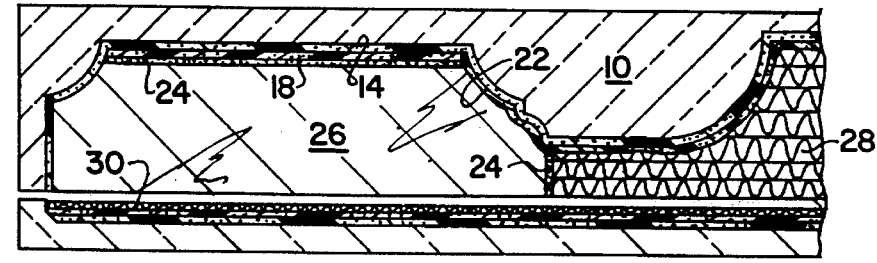
FIG. ID
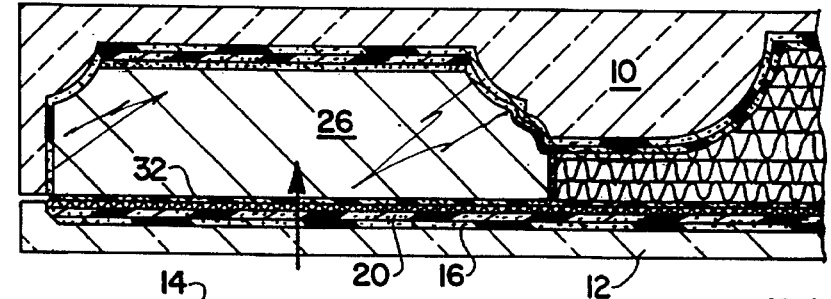
FIG. IE
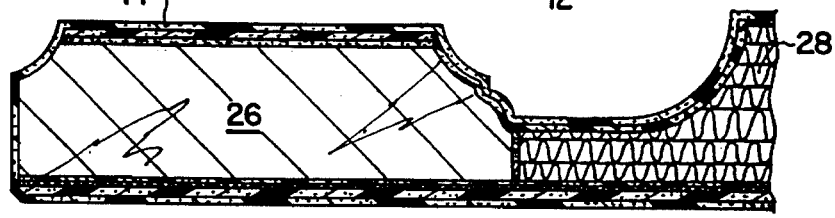
FIG. IF

COMPOSITE BOARD

BACKGROUND OF THE INVENTION

This invention relates to a method of making a composite board and to the composite board so made.

Many types of composite boards, for use as building components such as doors, as furniture components such as door or cupboard fronts, and the like are known. Examples of these boards include plywood boards, wood particle or fibre boards, gypsum boards, fibre reinforced cement boards and solid timber boards. All of these boards have their advantages and disadvantages.

There is however always a need for a new type of composite board with a good strength to weight ratio, whose surfaces are seamless, weather and abrasion resistant, and which can conform to any surface profile or simulate different types of material and which board has the necessary dimensional stability, stiffness, impact resistance and ease of decoration.

SUMMARY OF THE INVENTION

According to a first aspect of the invention there is provided a method of making a composite board having a front and a back in a mould which includes the steps of:

(a) applying a layer of a first composition comprising a thermosetting resin and a catalyst for the thermosetting resin, to the surface of the mould;

(b) allowing the thermosetting resin to polymerize to form the from of the composite board;

(c) applying a layer of a connecting composition comprising an adhesive or a second composition comprising a thermosetting resin and a catalyst for the thermosetting resin, to the inner surface of the front of the composite board in the mould;

and either (d) placing a structure comprising one or more laminae, each lamina comprising first and second sheets of a natural fibre material and a corrugated sheet or a cellular core of a natural fibre material sandwiched between the first and second sheets, the lamina having been impregnated with a third composition comprising a thermosetting resin, an extending liquid for the thermosetting resin and a catalyst for the thermosetting resin, the thermosetting resin having been polymerized, on the connecting layer of step (c); and (e) allowing the connecting composition to set to join the structure to the front of the composite board to form the composite board, and removing the composite board from the mould;

or (f) applying to the layer of step (c) a layer of a fibrous reinforcing material wetted with a fourth composition comprising a thermosetting resin and a catalyst for the thermosetting resin, and allowing the thermosetting resin to polymerise and allowing the connecting composition to set to join the layer of the fibrous reinforcing material to the front of the composite board to form an intermediate composite, and removing the intermediate composite from the mould;

(g) connecting to the free side of the intermediate composite using a layer of the connecting composition of step (c) a structure of step (d); and (h) allowing the connecting composition to set to join the structure to the free side of the intermediate composite to form the composite board.

In this case, the free side of the structure forms the back of the composite board.

However, preferably, the method of the invention includes the additional step of:

(i) connecting to the free side of the structure using a layer of the connecting composition of step (c), a back component comprising a layer of a fifth composition comprising a thermosetting resin and a catalyst for the thermosetting resin and optionally a layer of a fibrous reinforcing material wetted with an eighth composition comprising a thermosetting resin and a catalyst for the thermosetting resin, the thermosetting resin or resins having been polymerized, to form the back of the composite board.

The method of the invention preferably includes the additional steps of:

(j) after step (a) or step (b) and before step (c) applying to the layer of the first composition in the mould, either before or after polymerisation of the thermosetting resin, a layer of a fibrous reinforcing material wetted with a sixth composition comprising a thermosetting resin and a catalyst for the thermosetting resin, and allowing the thermosetting resin to polymerise; and/or (k) after step (c) and either before or after step (d) or step (f) placing in the mould adjacent an edge thereof and adjacent the structure, an elongate wooden member; and/or (l) before or after step (d) or step (f) or step (k) filling any gaps in the mould with a seventh composition comprising a thermosetting resin and a catalyst for the thermosetting resin and allowing the thermosetting resin to polymerise.

The first composition preferably includes 50 to 350% inclusive by weight of the thermosetting resin of an inorganic particulate filler such as for example barium sulphate, calcium carbonate, talc, hollow glass balloons, kaolin, silica or mica, or a combination of two or more thereof.

The connecting composition preferably comprises the second composition. Further, the thermosetting resin of the second composition is preferably the same as the thermosetting resin of the first composition to promote crosslinking.

The thermosetting resin of the third composition is preferably a resin chosen from urea, melamine or phenol formaldehyde or other formaldehyde condensation polymers, or is the same as the thermosetting resin of the first composition to promote cross-linking.

The thermosetting resin of the fourth composition is preferably the same as the thermosetting resin of the first composition to promote cross-linking.

The fifth composition is preferably the same as the first composition.

The sixth composition is preferably the same as the fourth composition.

The seventh composition preferably includes a suitable amount of short reinforcing fibres. The thermosetting resin of the seventh composition is preferably the same as the thermosetting resin of the first composition to promote cross-linking.

The thermosetting resin of the eighth composition is preferably the same as the thermosetting resin of the fifth composition to promote cross-linking.

The third composition may be one of those disclosed in South African Patent No 90/2260 to Plascon Technologies (Pty) Limited, and the first, second and fourth to eighth compositions may be those described more fully hereinafter.

According to a second aspect of the invention there is provided a composite board produced by the method of the invention.

BRIEF DESCRIPTION OF THE DRAWING

FIG. 1 is schematic view of the various steps of the method of the invention.

DESCRIPTION OF EMBODIMENTS

This invention relates to a method of making a composite board having a front and optionally a back in a mould which includes various steps.

Step (a) of the method comprises applying a layer of a first composition comprising a thermosetting resin and a catalyst for the thermosetting resin, to the surface of the mould.

The mould will have the profile and surface detail which is desired to be imparted to the final composite board. The mould may be for example a silicone rubber mould. The first composition may be applied to the mould by brush, by spray, by curtain coater or by any other suitable means to provide a layer that is uniform in thickness. The thickness of the layer is preferably from 100 microns to 1 mm inclusive.

The first composition (as well as the second, fourth, fifth, sixth, seventh and eighth compositions) is a liquid composition comprising a thermosetting resin and a catalyst for the thermosetting resin. The third composition is a liquid composition comprising a thermosetting resin, an extending liquid for the thermosetting resin and a catalyst for the thermosetting resin. Examples of various types of liquid compositions for use in the method of the invention are given below.

The thermosetting resin may be a phenolic resin, (phenol formaldehyde resole resin), preferably a liquid phenolic resin, which may be polymerised at room temperature or elevated temperature. Examples of suitable phenolic resins include:

Polylam 2432 from National Chemical Products Limited of Germiston South Africa, which is a liquid phenolic resin designed to cure at room temperature, with an acidic catalyst such as a blend of sulphonic acids, such as catalyst Vx-21 of National Chemical Products Limited; Cellobond J2027L, J2018L, J20/1096L and J20/1081L from British Petroleum Company plc, which may be catalysed with a catalyst such as Phencat 10, Phencat 15 or the VCm90 from the British Petroleum Company plc, or VX-21 from National Chemical Products Limited;

A phenol furfural resin catalysed with hexamethylene tetramine;

A blend of a phenolic resin with a melamine formaldehyde or a urea formaldehyde resin;

A urea formaldehyde, melamine formaldehyde or other formaldehyde condensation polymer.

The thermosetting resin may also be a liquid polyester resin such as the unsaturated isophthalic or orthophthalic liquid polyester resins. Examples of these are those manufactured by Scott Bader of England including Crystic 272 catalysed by catalyst powder B and Crystic 196 and those under the Atlac brand by DSM.

Other suitable polyester resins are those produced by National Chemical Products, Germiston, South Africa, such as Polylite 33410, Polylite 8130, Polylite 8000 and Polylite 8382X. Suitable latent catalysts for these resins include di-tert-butyl peroxy 3,3,5-trimethylcyclohexane in dibutyl phthalate such as those sold by Akzo Chemie under the name Triganox 29B240, Lucidol KL50, Triganox 21, Triganox C or Triganox K-70, benzoyl peroxide formulations, t-butylperbenzoate sold by Interox under codes TBTB and TBPB, dibenzoyl peroxide sold by Interox under code MIKP NA1 or t-Butyl 2-perethyl haxanoate. These catalysts generally trigger polymerisation at a temperature in the region of 60° C. upwards, more typically 80° C. upwards.

Suitable room temperature catalysts for these resins which have been accelerated with accelerators such as cobalt octoates or naphthenates or tertiary amines, are organic peroxides such as methylethyl ketone peroxide, cyclohexanone peroxide and similar.

Another type of thermosetting resin which may be used are the liquid room temperature curing acrylic and methacrylic acid esters and methyl methyacrylates, typically catalysed with benzoyl peroxide powders and urea formaldehyde and reelamine formaldehyde resins catalysed with acids and which may have been internally plasticised with glycols.

The third composition is a liquid composition comprising a thermosetting resin, such as those set out above and having the characteristics set out below, an extending liquid for the thermosetting resin, examples of which are set out below, and a catalyst for the thermosetting resin.

It is desirable that the precatalysed thermosetting resin has an extended pot life, i.e. the period of time during which no significant viscosity change occurs in the resin mix. A pot life of thirty days to several months is desirable. This may be achieved by suitable selection of the thermosetting resin and the extending liquid and the catalyst. The thermosetting resin, once precatalysed, may also be kept at a low temperature, for example at below 10° C., to extend the pot life.

The extending liquid has other important functions which are to provide variability as to the weight of the resin to be impregnated into the various elements, by controlling the percentage of resin in the liquid composition and to control resin viscosity, to promote resin penetration as a function of solvency, not to interfere with resin polymerisation and to be easily removed from the impregnated material and not to become a part of the resulting polymer, and to promote resin latency by molecular separation as well as catalyst dilution until the extending liquid is removed from the impregnated material.

Suitable extending liquids for use with phenolic resins are true solvents of the resin and are non reactive. Typical examples include water, C1 to C4 alcohols such as methanol, ethanol, propanol and butanol; and acetone and methyl ethyl ketone.

Suitable extending liquids for use with polyester resins include halogenated hydrocarbons such as dichloromethane, trichlorethylene, perchlorethylene, trichlorobromine, trichloroethane, triclorotrifluoroethane, carbon tetrachloride, chloroform, trichlorofluoromethane, toluol, xylene, butylacetate, cyclohexane, benzene, tetrahydrofuran, acetone and methylethylketone.

The liquid composition may also include other components such as an inhibitor, or free radical scavenger, an accelerator, a surfactant such as a sulphosuccinate for use with phenolic resins or an alkyl aryl sulphonate for use with polyester or epoxy resins, and extending particles such as silica fume, micronised corundum, borosilicate and silicon dioxide.

There are two particularly preferred third compositions for use in this invention. These liquid compositions are preferred because they have optimal pot life, or latency, they provide for suitable levels of resin impregnation into the materials to be impregnated, they provide for easy polymerisation of the thermosetting resins once impregnated and the extending liquid is easily recovered and is non reactive.

The first preferred liquid composition comprises a phenolic resin, 20 to 400% by weight of the phenolic resin of an extending liquid which is a C1 to C4 alcohol, i.e. methanol, ethanol, propanol or butanol, preferably methanol, optionally with a proportion of acetone, and a catalyst for the phenolic resin, such as an acidic catalyst such as a blend of an organic acid, e.g. a sulphonic acid and an inorganic acid, e.g. phosphoric or sulphuric acid, or alternatively an alkali or ester catalyst.

The second preferred liquid composition comprises an unsaturated polyester resin, preferably an orthophthalic or isophthalic polyester resin, 20 to 400% by weight of the resin of an extending liquid which is selected from dichloromethane, trichloroethylene, perchloroethylene, trichlorobromine, trichlorotrifluoroethane and fluorotrichloromethane, preferably dichloromethane, and a suitable catalyst such as t-butyl perbenzoate or preferably t-butyl 2-perethyl hexanoate.

The first composition preferably includes 50 to 350% by weight preferably about 100% by weight of the thermosetting resin of an inorganic particulate filler. The particulate filler is included for sizing, as a heat sink, for cohesive strength and for liquid phase flow. The preferred particulate filler is barium sulphate at a specific gravity of approximately 4,8 and a particle size of approximately 300 mesh. Barium sulphate is particularly used to promote flow, to settle into the mould surface picking up every detail, to add cohesive strength to the composition and to minimise shrinkage. Further particulate fillers include calcium carbonate, talc, hollow glass balloons, kaolin, silica or mica, all in the particle size spectrum range of from 65 to 300 mesh.

The first composition may also include other additives such as an anti-foam agent, for example Byk 057 or Byk 066 for unsaturated polyesters, or Byk 085 for phenol formaldehyde resole resins. In addition, the first composition may include a surfactant such as Disperbyk 163 or Tween 20 which is a polyoxethylene 20 sorbitan monolaurate by ICI, for either polyester or phenolic resins. These agents are added to ensure that the composition flows easily across the mould surface, wetting it intimately and that all entrained bubbles are freely and easily released so that the front layer is seamless, without bubbles and of consistent thickness without pull away, fish eyes or similar defects.

The first composition may also include other additives such as suitable pigments and rheological modifiers. For fire rated board surfaces, a flame retardant may be added to the composition, such as Fyrol 99 by Akzo, which is a chlorinated oligomeric phosphate ester.

Two typical examples of first compositions for use in the method of the invention will now be given.

EXAMPLE 1

Preferably for a structure impregnated with polyester or phenolic resins, and for simulating wood.

Polylite 33410 3 kg (Isophthalic unsaturated polyester resin by NCP - RSA)

AC1 accelerator (NCS Resins, RSA) 24 g (a 1% solution of cobalt naphthanate in white spirits)

Tween 20 (ICI) 15 g

Byk 057 (Byk Chemie) 8 g

Methyl Ethyl Ketone Peroxide 30 g

Barium Sulphate 2,4 kg

Calcium Carbonate (10 micron particle size) 600 g

Titanium Dioxide 140 g

Yellow Oxide 18 g

EXAMPLE 2

Preferably for a structure impregnated with phenol formaldehyde resole resin and for a fire rated surface J2018L phenol formaldehyde resole resin 3 kg (British Petroleum Plc)

Phencat 10 Acid Catalyst 300 g (British Petroleum Plc)

Byk 163 Surfactant (Byk Chemie) 6 g

Byk 085 Antifoam (BykChemie) 6 g

Calcium Sulphate Alpha or Beta Hemihydrate 1.5 kg

Silica Fume 120 g

Fyrol 99 (Akzo) 300 g

Step (b) of the method of the invention comprises allowing the thermosetting resin to polymerize to form the front of the composite board. For example, the mould may be passed under an inductive heat source such as infra red lamps in order to polymerise the thermosetting resin before the next component of the composite board is added.

Step (c) of the method of the invention comprises applying a layer of a connecting composition comprising an adhesive or a second composition comprising a thermosetting resin and a catalyst for the thermosetting resin, to the inner surface of the front of the composite board.

The connecting composition is used to adhere the structure of step (d) to the front of the composite board. As stated above, the connecting composition may be an adhesive but is preferably a second composition. The thermosetting resin of the second composition is preferably the same as the thermosetting resin of the first composition to promote cross-linking.

When the connecting composition is an adhesive, it is preferably based on the thermosetting resin of the first composition, with a rheological control agent chosen from silica fume, silicaceous microfibres such as Aerosil by Degussa, or short length cellulose or synthetic polymer fibres.

Step (d) of the method of the invention comprises placing a structure comprising one or more laminae, each lamina comprising first and second sheets of a natural fibre material and a corrugated sheet or a cellular core of a natural fibre material sandwiched between the first and second sheets, the lamina having been impregnated with a third composition comprising a thermosetting resin, an extending liquid for the thermosetting resin and a catalyst for the thermosetting resin, the extending liquid having been recovered for reuse, the thermosetting resin having been polymerized, on the connecting layer of step (c).

In the first embodiment, each lamina comprises first and second sheets of a natural fibre material, such as for example single or multiple kraft paper sheeting, wood pulp sheeting and the like, with a corrugated sheet sandwiched between the first and second sheets, the corrugated sheet being for example single or double walled corrugated cardboard with the corrugations orientated parallel with the board surfaces.

In the second embodiment, each lamina comprises first and second sheets of a natural fibre material such as for example single or multiple kraft paper sheeting, wood pulp sheeting and the like, with a cellular core sandwiched therebetween. Each cell of the cellular core may be of triangular, hexagonal, rectangular, square or eliptical cross section, and the cellular core may be made of corrugated cardboard or kraft paper or the like with the corrugations or cells orientated perpendicular to the board surfaces.

Each lamina is impregnated with a third liquid composition comprising a thermosetting resin, an extending liquid for the thermosetting resin and a catalyst for the thermosetting resin, the thermosetting resin having been polymerised after the recovery of the extending liquid, to give the lamina the required degree of rigidity and strength. Examples of suitable liquid compositions are as set out above.

A method of impregnation and polymerisation of a lamina is given below.

This method includes the steps of:

1. impregnating the lamina with a liquid composition, for example by in-line calibrated curtain coating apparatus or by immersion;
2. recovering the extending liquid by preferably evaporation and recondensation or alternatively evaporation and absorption in, for example, activated carbon, followed by regeneration by steam and recollection from a distillation column;
3. polymerising the thermosetting resin, for example, by subjecting the lamina to suitable conditions of temperature.

A more specific method for the production of a lamina comprising first and second sheets with a corrugated sheet sandwiched therebetween will now be given.

Given that the first and second sheets of natural fibre material and the interposed corrugated sheet of a natural fibre material have a large surface area to volume or mass ratio, impregnation with the liquid composition is easily achieved by discontinuous simple immersion of pre-made-up corrugated board, the recapture for reuse of the extending liquid, followed by resin polymerisation by heat, or by calibrated application of the liquid composition to moving first and second sheets of a natural fibrous material and the interposed corrugated or to-be-corrugated sheet of a natural fibrous material, and the recapture for reuse of the extending liquid, all in nitrogen purged application stations on a continuous corrugated board production line and applying preferably the same resin as is used in impregnation simply modified rheologically and catalysed to serve as a glue, the temperature on the line serving to polymerise or condense the thermosetting resin to produce flat strong resin modified sheets of corrugated natural fibrous material board, which can finally go into the lamina make-up procedure.

As an option, the layer of the connecting composition could be applied to the structure of step (d) which is then placed on the front of the composite board in the mould.

Step (e) of the method of the invention comprises allowing the second composition to set to join the structure to the front of the composite board to form the composite board, and removing the composite board from the mould.

Alternatively, to steps (d) and (e) there may be carried out steps (f) to (h).

Step (f) of the method of the invention comprises applying to the layer of step (c) a layer of a fibrous reinforcing material wetted with a fourth composition comprising a thermosetting resin and a catalyst for the thermosetting resin, and allowing the thermosetting resin to polymerise and allowing the connecting composition to set to join the layer of the fibrous reinforcing material to the front of the composite board to form an intermediate composite, and removing the intermediate composite from the mould.

The fibrous reinforcing material may be for example chopped strand fibreglass mat, typically at 300 g/m², woven fibreglass rovings, or nonw-oven synthetic polymer fibre in the range of 120 to 450 g/m², such as 130 g/m² bicomponent non-woven 85% polyester fibre and 15% polypropylene fibre, and wetted with a liquid composition which is preferably the same as the first composition.

Step (g) of the method of the invention comprises connecting to the free side of the intermediate composite using a layer of the connecting composition of step (c), a structure of step (d).

Step (h) of the method of the invention comprises allowing the connecting composition to set to join the structure to the free side of the intermediate composite to form the composite board.

Thereafter, the composite board of step (e) or step (h) may be treated in the same manner as follows.

Step (i) of the method of the invention comprises connecting to the free side of the structure, using a layer of the connecting composition of step (c), a back component comprising a layer of a fifth composition comprising a thermosetting resin and a catalyst for the thermosetting resin, and optionally a layer of a fibrous reinforcing material wetted with an eighth composition comprising a thermosetting resin and a catalyst for the thermosetting resin, the thermosetting resin or resins having been polymerised, to form the back of the composite board.

The back component may be manufactured in a suitable mould in the same manner as the front. Further, the fifth composition may be any of those compositions described above.

The fifth composition is preferably the same as the first composition.

The thermosetting resin of the eighth composition is preferably the same as the thermosetting resin of the fifth composition.

The method of the invention preferably includes various additional steps.

Step (j) after step (a) or step (b) and before step (c) comprises applying to the layer of the first composition in the mould, either before or preferably after polymerisation of the thermosetting resin, a layer of a fibrous reinforcing material wetted with a sixth composition comprising a thermosetting resin and a catalyst for the thermosetting resin, and allowing the thermosetting resin to polymerise. The fibrous reinforcing material may be as described above and the sixth composition is preferably the same as the first composition.

Step (k) of the method of the invention comprises, after step (c) and either before or after step (d) or step (f), of placing in the mould adjacent an edge or edges thereof, and adjacent to and optionally abutting the structure, one or more elongate wooden members.

The wooden member may be made of wood or a wood substitute such as a structural foam or cellular polystyrene, such as Timbron by Plexite of the United Kingdom. The elongate wooden element is used for the purpose of accommodating mechanical fixings such as hinges, handles, bolts and jointing mechanisms such as screws, or for edge impact strength or overall component stability. Optionally the elongate wooden elements may be impregnated with a liquid composition such as the third composition.

Step (1) of the method of the invention comprises, before or after step (d) or step (f) or step (e), filling any gaps in the mould with a seventh composition comprising a thermosetting resin and a catalyst for the thermosetting resin.

The seventh composition may be any of the liquid compositions described above.

The seventh composition preferably includes a suitable amount of short reinforcing fibres. Further, the thermosetting resin of the seventh composition is preferably the same as the thermosetting of the first composition.

The short reinforcing fibres may be synthetic or natural fibrous materials and the seventh composition may also include hollow glass balloons such as for example Fillite of Runcorn in England or Centil by Lewis & Everit of South Africa, so that this filler composition has the necessary properties of shock resistance, filling, sizing and consistent liquid phase uniformity.

When the layer forming the front or the back of the composite board does not include a layer of a fibrous reinforcing material, it must be attached to another element of the composite board before being removed from the mould. However, when the layer forming the front or the back of the composite board does include a layer of a fibrous reinforcing material, then the layer may be removed from the mould before being attached to another element of the composite board.

Steps (a) and (e) and optionally (i) of the method of the invention are generally used for the formation of doors, while steps (a) to (c) and (f) to (h) and optionally (i) of the method of the invention are generally used for the formation of building boards.

The invention will now be described in more detail with reference to the accompanying drawing.

Referring to FIG. 1, various steps in the manufacture of a composite board for use as a cabinet door are set out.

FIG. 1A shows the front (top) and back (bottom) moulds 10,12 for the formation of a composite board. The moulds 10,12 are preferably made from a silicone rubber.

FIG. 1B shows the application of a layer of 14,16 of a first composition to the faces of the moulds 10,12.

FIG. 1C shows the placement of a sheet 18 of chopped strand fibreglass or non-woven synthetic organic fibre, suitably wetted with a sixth composition comprising a thermosetting resin and a catalyst for the thermosetting resin to the flat sections of the moulds 10,12. FIG. 1C also illustrates the application of a layer 22 of a thermosetting resin heavily filled with organic fibres to the curved sections of the mould 10.

FIG. 1D shows the placement of an elongate wooden member 26 machined to the profile of the mould 10, in position, with a layer of a connecting composition 24 between the elongate wooden member 26 and the layer 18 to connect the two together. FIG. 1D also shows the placement of a structure 28 comprising a plurality of laminae in position in the mould 10, the structure 28 being connected to the outer layer 14 by means of the layers 22, 24. FIG. 1D also shows the placement of a structure of resin impregnated multilayer kraft sheeting 30 placed in position on the mould 12.

FIG. 1E shows the joining of the composite board in the front mould 10 to the back component in the mould 12 using a layer 32 of thixotropic rheologically modified thermosetting resin, serving as an adhesive.

FIG. 1F shows the completed composite board for use as a cabinet door after demoulding from the mould 10,12.

The advantages of a composite board of the invention are that it has a very high strength to weight ratio, it is light and provides surfaces that are easy to decorate or that simulate natural materials such as wood, that may be made to conform to any profile such as a wood carving or surface texture such as leather, that is easy to incorporate into another structure by mechanical methods such as hinges, that is seamless, weatherproof, and resistant to wear, and that is cost effective.

I claim:

1. A method of making a composite board having a front and a back in a mould includes the steps of:
   (a) applying a layer of a first composition comprising a thermosetting resin and a catalyst for the thermosetting resin, to the surface of the mould;
   (b) allowing the thermosetting resin to polymerize to form the front of the composite board;
   (c) applying a layer of a connecting composition comprising an adhesive or a second composition comprising a thermosetting resin and a catalyst for the thermosetting resin, to the inner surface of the front of the composite board in the mould;

and either (d) placing on the layer of step (c) a structure comprising one or more laminae, each lamina comprising first and second sheets of a natural fibre material and a corrugated sheet or a cellular core of a natural fibre material sandwiched between the first and second sheets, the lamina having been impregnated with a third composition comprising a thermosetting resin, an extending liquid for the thermosetting resin and a catalyst for the thermosetting resin, the thermosetting resin having been polymerized; and
   (e) allowing the connecting composition to set to join the structure to the front of the composite board to form the composite board, and removing the composite board from the mould;

or (f) applying to the layer of step (c) a layer of a fibrous reinforcing material wetted with a fourth composition comprising a thermosetting resin and a catalyst for the thermosetting resin, and allowing the thermosetting resin to polymerise and allowing the connecting composition to set to join the layer of the fibrous reinforcing material to the front of the composite board to form an intermediate composite, and removing the intermediate composite from the mould;
   (g) connecting to the side of the intermediate composite not connected to the front of the composite boards, using a layer of the connecting composition of step (c), a structure of step (d); and
   (h) allowing the connecting composition to set to join the structure to the free side of the intermediate composition to form the composite board.

2. A method according to claim 1 which includes the steps of:
   (i) connecting to the free side of the structure using a layer of the connecting composition of step (c), a back component comprising a layer of a fifth composition comprising a thermosetting resin and a catalyst for the thermosetting resin and optionally a layer of a fibrous reinforcing material wetted with an eighth composition comprising a thermosetting resin and a catalyst for the thermosetting resin, the thermosetting resin or resins having been polymerized, to form the back of the composite board.

3. A method according to claim 1 which includes the step of:
   (j) after step (a) or step (b) and before step (c) applying to the layer of the first composition in the mould, a layer of a fibrous reinforcing material wetted with a sixth composition comprising a thermosetting resin and a catalyst for the thermosetting resin, and allowing the thermosetting resin to polymerise.

4. A method according to claim 1 which includes the step of:

(l) before or after step (d) or step (f) or step (k) filling any gaps in the mould with a seventh composition comprising a thermosetting resin and a catalyst for the thermosetting resin and allowing the thermosetting resin to polymerise.

5. A method according to claim 1 wherein the connecting composition comprises the second composition.

6. A method according to claim 5 wherein the thermosetting resin of the second composition is the same as the thermosetting setting resin of the first composition.

7. A method according to claim 1 wherein the thermosetting resin of the third composition is a formaldehyde condensation polymer.

8. A method according to claim 1 wherein the thermosetting resin of the third composition is the same as the thermosetting resin of the first composition.

9. A method according to claim 1 wherein the thermosetting resin of the fourth composition is the same as the thermosetting resin of the first composition.

10. A method according to claim 2 wherein the fifth composition is the same as the first composition.

11. A method according to claim 3 wherein the sixth composition is the same as the fourth composition.

12. A method according to claim 4 wherein the thermosetting resin of the seventh composition is the same as the thermosetting resin of the first composition.

13. A method according to claim 1 wherein the thermosetting resin of the eighth composition is the same as the thermosetting resin of the fifth composition.

14. A method according to claim 1 wherein in step (d) or step (g), the structure comprises one or more laminae, each lamina comprising first and second sheets of a natural fibre material with a corrugated sheet sandwiched between the first and second sheets.

15. A method according to of claim 1 wherein in step (d) or step (g) the structure comprises one or more laminae, each lamina comprising first and second sheets of a natural fibre material with a cellular core sandwiched there between.

* * * * *